United States Patent Office 3,847,968
Patented Nov. 12, 1974

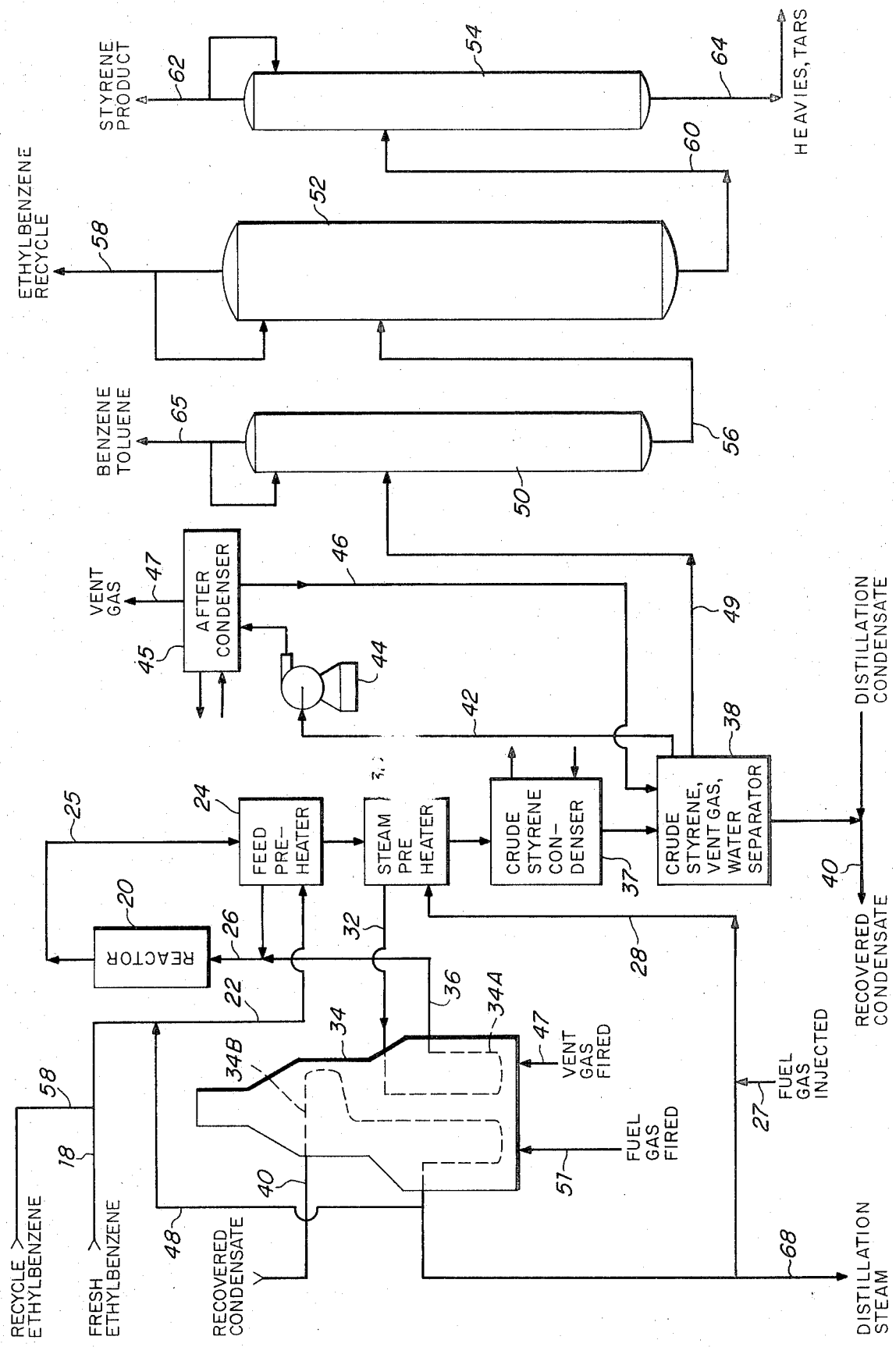

3,847,968
METHOD OF PRODUCING STYRENE
Richard E. Hughes, Belmont, Mass., assignor to The
Badger Company, Inc., Cambridge, Mass.
Filed July 30, 1973, Ser. No. 383,584
Int. Cl. C07c 5/18, 15/20
U.S. Cl. 260—669 R                                   16 Claims

ABSTRACT OF THE DISCLOSURE

Styrene is produced by passing a mixture of ethylbenzene and super-heated steam over a suitable dehydrogenation catalyst. A quantity of fuel gas (typically having a high methane content) is admixed with the ethylbenzene-stream admixture to serve as a diluent and also as a heat carrier. The fuel gas may be recovered as a vent gas and recycled and used as a fuel, e.g., to heat the steam.

This invention relates to an improved method and process for producing styrene. More particularly the invention provides a system and process for producing styrene by the dehydrogenation reaction of ethylbenzene, with reduced steam requirements.

Due largely to its utility in the production of plastics and synthetic rubber, styrene has achieved considerable industrial importance. It can be homopolymerized to produce polystyrene, a widely used synthetic resin, and can be copolymerized with different monomers to yield resins which are suitable for manufacturing articles by molding, casting and the like.

It is well known that styrene can be produced by passing a mixture of ethylbenzene and steam over a bed of a suitable dehydrogenation catalyst, e.g. iron oxide, at elevated temperatures. Typically, ethylbenzene is vaporized, heated, and passed together with super-heated steam through a dehydrogenation reactor containing a bed of suitable catalyst. This dehydrogenation reaction is highly endothermic and a considerable drop in temperature accompanies the reaction and has the effect of limiting the yield. To offset the aforesaid drop in temperature and thereby achieve a suitable yield, a substantial excess of super-heated steam has been used. Actually, the steam has two functions. One function is to supply heat to the reaction. The other function is to dilute the feed, which favors the forward reaction, i.e., the production of styrene. Typically, the art has considered it necessary to dilute the system with steam at a mole ratio of at least about 16 to 1, steam-to-ethylbenzene feed, to achieve a commercially acceptable reaction rate and yield.

As would be expected such large steam requirements demand relatively large installations and relatively large inputs of heat energy, with a consequent increase in the capital equipment costs.

Accordingly, the primary object of the present invention is to provide an improved method for producing styrene monomer by the dehydrogenation of ethylbenzene.

A more specific object is to provide a method which reduces the capital equipment and energy requirements involved in producing styrene by the dehydrogenation of ethylbenzene.

Another specific object is to reduce the size of the dehydrogenation unit and the amount of steam required to form a given amount of styrene.

A further specific object is to increase the capacity for styrene production of a given dehydrogenation unit without substantially increasing energy requirements.

Basically, these and other objects are accomplished in the present invention by a system which involves using heated fuel gas to satisfy part of the heating and feed dilution requirements in a styrene dehydrogenation unit. The fuel gas preferably is one which has a relatively high methane content. The fuel gas is separated from the reaction effluent and may be used as fuel for heating the steam.

The foregoing objects and advantages are better appreciated and the invention better understood by the following detailed description taken in connection with the accompanying drawing which is a schematic illustration of a system embodying a preferred embodiment of the invention.

Referring now to the drawing, the illustrated process is normally continuous with ethylbeznene and steam being constantly supplied to the system and styrene being constantly recovered as product. Ethylbenzene and steam are preheated and are supplied to a dehydrogenation reactor unit 20 which contains an appropriate dehydrogenation catalyst and is operated under conditions promoting conversion of ethylbenzene to styrene.

The ethylbenzene feed (typically formed by the alkylation of benzene) is supplied via a line 18 and a line 22 to a heat exchanger 24 where it is preheated by heat exchange with the dehydrogenation reaction effluent which is fed to feed preheater 24 by a line 25 connected to the outlet of reactor unit 20. The preheated ethylbenzene is passed via a line 26 to dehydrogenation unit 20. En route to the reactor unit 20 the ethylbenzene feed is mixed with and heated further by superheated steam introduced to line 26 by a line 36. By way of example, the ethylbenzene feed is preheated in heat exchanger 24 to a temperature in the range of about 800–1000° F., preferably about 1000° F.

Steam is supplied via a line 28 to a heat exchanger 30 where it is preheated to between 600 and 700° F. by heat exchange with the effluent from dehydrogenation unit 20. The preheated steam from heat exchanger 30 is passed via a line 32 to a gas fired heater 34 where it is superheated in heating coils 34A, preferably to a temperature below but near the temperature at which ethylbenzene will pyrolyze, e.g. typically in the range of about 1000–1400° F., and preferably about 1200–1300° F. The superheated steam is passed via line 36 to line 26 where it is mixed with the preheated ethylbenzene before the latter is fed into the reactor unit 20.

In accordance with this invention, fuel gas is admixed with the ethylbenzene-steam reactor feed mixture. The fuel gas is supplied via a line 27 to line 28 where it is admixed with the steam prior to the steam being preheated. As a consequence, the fuel gas is heated in preheater 30 and superheater 34 along with and to the same temperature as the steam. Obviously the fuel gas may be heated separately from the steam and then admixed with the superheated steam and heated ethylbenzene before introduction to the inlet of dehydrogenation unit 20.

The fuel gas preferably has a relatively high methane content. The fuel gas may also contain some, e.g. 5.0 volume percent, of ethane and propane. Small amounts, e.g. 1–2 volume percent, of higher molecular weight hydrocarbons may also be present in the fuel gas.

The fuel gas serves two purposes. One purpose is to dilute the feed. The fuel gas also acts as a heat carrier. With regard to this latter purpose, an advantage of using fuel gas is that it has an appreciable higher heat capacity than steam at the operating temperatures and pressures normally utilized in dehydrogenation reactions. Accordingly, a given volume of fuel gas will provide more of the required heat to the reaction than the same volume of steam at the same pressure. Other advantages of operating with fuel gas addition include the ability to operate at lower pressures for a given conversion rate, the ability to increase productivity of a given installation without increasing the size of the reactor vessel, and a reduction in the amount of steam required to be supplied to reactor unit 20, as will become clear hereinafter.

The amount of fuel gas added to the reaction may vary over a relatively wide range and the amount of steam required will depend on the amount of added fuel gas. However, in all cases a certain amount of steam is retained in the reactor feed since the steam is believed to clean the catalyst through a water-gas reaction. In the practice of this invention, a steam-to-ethylbenzene molal ratio of at least about 6 to 1 is required at the inlet to the reactor unit 20 to achieve satisfactory catalyst cleaning. The steam-to-ethylbenzene mole ratio is kept below about 16 to 1, and preferably within a range of about 10:1 to 13:1. Of course, the mole ratio may exceed 16 to 1, but this is not preferred since it defeats a purpose of the invention, which is to reduce the overall steam requirement. The fuel gas is introduced at a rate such as to provide from about 1 to about 4 moles of fuel gas per mole of ethylbenzene at the inlet to the reactor unit. Typically but not necessarily, the mixture of steam and fuel gas supplied via line 36 will provide a ratio between about 8 to about 20 moles of fuel gas and steam for each mole of ethylbenzene supplied to the reactor inlet.

The dehydrogenation unit 20 comprises a catalytic dehydrogenation reaction section that is operated so as to convert ethylbenzene to styrene. Any suitable ethylbenzene dehydrogenation catalyst may be employed in the reaction section of unit 20. Typical of the commercially available catalysts that may be used are those having the following composition: (a) 90% $Fe_2O_3$, 4% $Cr_2O_3$, and 6% $K_2CO_3$; (b) 62.5% $Fe_2O_3$, 2.2% $Cr_2O_3$, and 35.3% $K_2O$; (c) 60–95% iron oxide, 4–39% potassium oxide and 1–10% chromium oxide; (d) 5–60% cobalt oxide, 10–60% iron oxide, 4–39% potassium oxide and 1–10% chromium oxide; and (e) 50–90% iron oxide, 9–49% calcium oxide and 1–4% chromium oxide. Still other suitable dehydrogenation catalysts well known to persons skilled in the art may be used.

The reaction section of the dehydrogenation unit 20 is operated under conditions well known in the art. Thus it may be operated at atmospheric, elevated or reduced pressures and at temperatures in the range of about 1000–1200° F. and preferably about 1050–1175° F. Under such conditions the fuel gas, at least as far as its lower weight (i.e. methane, ethane and propane) components are concerned, is substantially non-reactive. Preferably, reactor unit 20 is operated at a minimum practical pressure inasmuch as a low operating pressure generally favors the reaction conversion of ethylbenzene to styrene. Generally an operating pressure in the range of from about 8 p.s.i.a. to about 25 p.s.i.a. is preferred. Further details of the construction and operating requirements of dehydrogenation unit 20 are not believed to be required herein since such units are well known in the art and also because the novel features of the invention reside elsewhere in the illustrated system. Illustrative of the prior art are U.S. Pats. 2,831,907, 3,100,807, 3,223,743, 3,306,942, 3,409,689 and 3,417,156, and the references cited therein.

As is well known, the dehydrogenation reaction produces styrene plus a number of by-products, including benzene, toluene, styrene tar residue and dehydrogenation vent gases which typically include hydrogen, methane and carbon dioxide. Of course, the reaction effluent will also contain unreacted ethylbenzene, steam and the unreacted components of the fuel gas which is added to the reaction mixture in accordance with this invention. Therefore, means are provided for separating and recovering the styrene product and other components of the dehydrogenation reaction effluent. The latter passes through the ethylbenzene and steam preheaters 24 and 30 to a condenser 37 which is operated so as to condense the styrene product and steam. From condenser 37 the cooled effluent passes to a separator 38 where it is separated into three fractions, a bottom fraction consisting almost wholly of water, a vent gas fraction which includes the unreacted fuel gas, and a crude styrene fraction. The bottom fraction is recovered via a line 40. The vent gas fraction is passed by a line 42 to a compressor 44 where it is compressed. The compressed gases are then passed to a condenser 45 where any low boiling by-products such as benzene and toluene are condensed and then returned via a line 46 to separator 38. The uncondensed vent gases and fuel gas are recovered from condenser 45 via a line 47 and fed to heater 34 where they are fired to supply heat to superheating coils 34A and 34B. Alternatively, the gases may be delivered to storage or disposal facilities as may be desired, in which case fresh fuel gas is introduced to heater 34 via a line 51 for firing to heat coils 34A and 34B.

The aqueous condensate recovered via line 40 may be passed to a suitable disposal unit. Preferably, however, the recovered condensate is passed through heating coil 34B of heater 34 where it is revaporized. A portion of this regenerated steam is passed via a line 48 to line 22 where it is admixed with the ethylbenzene feed, and the balance is used as the steam supply for line 28 and line 68.

Stripped of fuel and vent gases and aqueous condensate, the product effluent from the dehydrogenation unit 20 is delivered via a line 49 to a multi-stage fractional distillation unit which comprises three sections illustrated as distillation columns 50, 52 and 54. These columns are designed and operated so as to effect separation of the reactor effluent into unreacted ethylbenzene, styrene monomer, styrene tar residue and benzene-toluene by-product fractions. As is obvious to persons skilled in the art, each of the three distillation sections may comprise more than one distillation column.

Distillation column 50 is operated so as to recover a mixture of toluene and benzene as overhead via line 65. By way of example, distillation column 50 may be designed to operate at bottom or base pressures in the range of about 3–10 p.s.i.a. and at bottom temperatures in the range of about 124–275° F. Although not shown, it is to be understood that the benzene-toluene overhead fraction recovered from column 50 may be fractionally distilled to effect separation of the benzene and toluene, and the recovered benzene may be recycled and alkylated to produce additional ethylbenzene feed while the recovered toluene may be recycled to dehydrogenation unit 20 (see British Pat. 1238602 dated Oct. 27, 1969 for Toluene Recycling) for dealkylation to form additional benzene and methane. The benzene which is produced by this dealkylation of the toluene may be recycled for alkylation to produce additional ethylbenzene.

The bottoms fraction from distillation column 50, consisting primarily of unreacted ethylbenzene, styrene monomer and styrene tar residue, is fed via a line 56 to the second distillation column 52. The latter is designed and operated so as to effect separation of its feed into an overhead fraction consisting almost wholly of unreacted ethylbenzene, and a bottoms fraction rich in styrene and polystyrene residue. By way of example, column 52 may be operated at bottom pressures in the range of about 3–10 p.s.i.a. and at bottom temperatures in the range of about 125–275° F. The recovered ethylbenzene overhead fraction is passed via a line 58 to the ethylbenzene feed line 22, whereby it is recycled to dehydrogenation unit 20.

The bottom fraction from column 52 is fed via a line 60 to distillation column 54. The latter column is designed and operated so as to effect separation of the styrene monomer and styrene tar residue as overhead and bottom fractions respectively. By way of example, column 54 may de designed to operate at bottom pressures in the range of about 1–4 p.s.i.a., and at bottom temperatures in the range of about 100–220° F., with the result that substantially pure styrene monomer is recovered and removed as product via a line 62. The styrene tar residue is recovered via a line 64. This fraction usually consists mostly of styrene polymers which boil at a higher temperature than styrene monomer, plus higher boiling aromatic compounds and any polymerization inhibitors which may be added to the dehydrogenation reaction effluent to limit styrene polymerization.

The nature of the advantages achieved by the instant invention is seen from the following examples.

Styrene is prepared by the dehydrogenation of ethylbenzene in two runs. Example I illustrates the prior art in which superheated steam and ethylbenzene are reacted over a bed of a suitable catalyst. In Example II a quantity of fuel gas is added to the dehydrogenation reactor feed mixture and the ratio of steam to ethylbenzene in the feed mixture is reduced. These examples are to be considered together with Table I below.

EXAMPLE I

Referring to the accompanying flow sheet, an ethylbenzene feedstock and recycled ethylbenzene recovered from column 52 are passed continuously via lines 18 and 58 and line 22 to preheater 24 where the mixture thereof is preheated to a temperature of about 1000° F. The preheated ethylbenzene is then mixed with superheated steam delivered by line 36 at a temperature of about 1315° C. The resulting mixture at a temperature of about 1200° C. and at a pressure of about 25 p.s.i.a. is fed via line 26 into the reaction section of dehydrogenation reaction unit 20 wherein the ethylbenzene is dehydrogenated over a catalyst bed comprising iron, chromium and potassium oxides to form styrene. The reaction effluent exits the reactor at a temperature of about 1040° F. and a pressure of about 21 p.s.i.a.

The reaction effluent from dehydrogenation unit 20 is cooled in heat exchangers 24 and 30 and condenser 37, and passed to separator 38 where condensed steam is removed via line 40 and condensed vent gases are removed via line 42. The condensed steam is recycled to heating coil 34B via line 40 where it is reconverted to steam, part of which is used to vaporize the ethylbenzene in feed line 22 via line 48, another part is introduced into line 28 for heating in exchanger 30 and heater 34, and the rest is delivered via a line 68 to the fractional distillation section where it is employed to supply the necessary heat of distillation to columns 50, 52 and 54 via suitable heat exchanger means (not shown). The condensate from these latter mentioned heat exchangers is recycled to heating coil 34B via line 40. The compressed gases removed by line 42 are compressed in compressor 44 to a pressure of about 35 p.s.i.g. at a temperature of about 100° F. The compressed gases are then passed through condenser 45 and then via line 47 to heater 34 and fired. Additionally, methane fuel gas is supplied via line 51 from and external supply and fired in heater 34.

The condensed reaction effluent, minus condensed water and vent gases, is fed via line 49 at a temperature of about 100° F. to distillation column 50 which is operated at a base pressure of about 5 p.s.i.a. and a base temperature of about 225° F. A benzene-toluene mixture is recovered as an overhead fraction from column 50, while the remaining hydrocarbons are recovered as a bottoms product and fed to column 52. Column 52 is operated at a base temperature of about 230° F. and a base pressure of about 5.0 p.s.i.a. A 97% pure ethylbenzene fraction is recovered as overhead from column 52 and recycled via line 58 to dehydrogenation unit 20.

The bottoms fraction from ethylbenzene column 52, consisting almost wholly of styrene monomer and styrene tar residue, is fed continuously to distillation column 54 which is operated at a base temperature of about 185° F. and a base pressure of about 2.5 p.s.i.a. Styrene monomer product is removed as overhead and styrene tar residue is removed as a liquid bottoms fraction.

EXAMPLE II

Example I is repeated without change except that a quantity of fuel gas comprising substantially only methane gas is injected via line 27 into the steam supply in line 28, the quantity of steam fed to the reactor unit 20 in admixture with the ethylbenzene is reduced, and no fuel gas from an external supply is supplied by line 51 to heater 34 for direct firing. Instead, heating in heater 34 is generated by firing vent and recovered fuel gases introduced to heater 34 via line 47. The steam and fuel gas mixture is heated to about 1315° F. in heater 34 before being mixed with the preheated ethylbenzene in line 26. The resulting mixture is introduced into dehydrogenation reactor 20.

The dehydrogenation reaction, the separation and recovery of the reaction products are the same as in Example I except that in this case the vent gases comprise a greater proportion of methane gas due to the injections of fuel gas into line 28 via line 27.

The nature of the decrease of energy requirements achieved by the present invention is seen in the following table which compares (all values are on the basis of moles) the reactants and products of the foregoing examples.

TABLE I

| Line Number | Component | Example I | Example II |
|---|---|---|---|
| 58 | Ethylbenzene recycle | 1.00 | 1.00 |
| 18 | Ethylbenzene feed | 1.12 | 1.12 |
| 48 | Steam for feed vaporization | 2.00 | 2.00 |
| 28 | Steam for diluent and heat carrier | 31.00 | 27.00 |
| 68 | Steam for distillation | 8.00 | 8.00 |
| 27 | Fuel gas injected | | 2.80 |
| 51 | Fuel gas direct fired | 3.10 | |
| 49 | Crude styrene product | 2.12 | 2.12 |
| 62 | Purified styrene product | 1.00 | 1.00 |
| 40 | Condensate recovered | 41.00 | 37.00 |
| 47 | Vent gas recovered and fired | 1.20 | 4.00 |
| 65 | Benzene-toluene byproduct | 0.10 | 0.10 |
| 64 | Tars and heavies | 0.02 | 0.02 |

As will be seen from the above Table, using a quantity of fuel gas as heat source and diluent in place of some of the steam will result in a net steam saving of 4.0 moles and a net fuel gas saving of 0.3 moles per mole of styrene produced. This translates to a savings of about 0.69 lbs. of steam, or about 0.046 lbs. of methane, saved per pound of styrene produced. Since the net combustion constant of methane is about 346,000 B.t.u. per pound, it is seen that by substituting a quantity of fuel gas for some of the steam requirements in the manner described one can realize a fuel gas thermal input savings of about 1000 B.t.u. per pound of styrene produced as a typical example. This represents a savings of about 10% in fuel costs. The instant invention also requires about 10% less steam which means less fresh water requirements as well. The importance of such savings, both from a standpoint of economics and the ecological significance of such savings will be obvious to one skilled in the art.

The system as herein described and illustrated offers other advantages. For one thing, since the thermal requirements are less, heater 34 can be made somewhat smaller. Also, the volume of reactants fed into the dehydrogenation unit 20 is somewhat less, which allows this unit to also be made smaller. Smaller reactors and reactor units typically cost less to build. Furthermore, the capacity of a given installation can be increased relatively inexpensively without having to increase the size of the heater or the dehydrogenation reaction unit simply by providing for injection of fuel gas into the reaction mixture in accordance with the teachings herein.

Finally, the addition of fuel gas to the reaction mixture has an advantage of possibly suppressing or reducing the hazards of explosion or fire, particularly in the vent gas mixture. Vent gas mixtures from dehydrogenation reactions typically comprise a quantity of hydrogen gas. As is well known in the art, combustion of such mixtures may occur spontaneously if air is leaked into the mixture in certain concentrations. The concentration range over which combustion can spontaneously occur is called the flammability envelope. A typical reaction effluent from the dehydrogenation of ethylbenzene may contain mixtures of hydrogen gas and air within the flammability envelope and at or near temperatures and pressures under which auto ignition may occur. Therefore, the possibility of fire or explosion in an ever present danger in a typical dehydrogenation installation. Sufficient fuel gas may be added to the system to dilute the hydrogen gas-air mixture so that the mixture is outside of its flammability envelope, and thus render the mixture safe from explosion or combustion. Further details of explosion and flammability suppression by the addition of fuel gas is described in detail in the article entitled "Safe Vapor Phase Oxidation," by W. P. Talmage, *Chemical Technology*, February 1971.

It is to be appreciated that the invention is applicable to dehydrogenation of alkylated aromatic hydrocarbons other than ethylbenzene. Thus, for example, isopropylbenzene may be dehydrogenated to produce homologues of styrene. In each case a quantity of heated fuel gas is added to the reaction mixture prior to the dehydrogenation of the hydrocarbons in the manner above described.

What is claimed is:

1. In a process involving dehydrogenation of ethylbenzene in the presence of steam in a dehydrogenation reactor at elevated temperature to produce styrene, the improvement comprising introducing a quantity of combustible fuel gas at an elevated temperature into the dehydrogenation reactor as a heat source, and thereby reducing the steam requirements of said process.

2. A process according to claim 1 further including the step of recovering unreacted fuel gas from said reactor, combusting at least a portion of said recovered fuel gas, using the resulting combustion heat to generate steam, and feeding said generated steam to said reactor.

3. In a process for producing styrene comprising feeding a reaction mixture consisting of ethylbenzene and steam to a reactor, dehydrogenating said ethylbenzene in said reactor so as to produce a reaction effluent comprising styrene and steam, and separating styrene and steam from said reaction effluent, the improvement comprising feeding a heated combustible fuel gas to said reactor together with said reaction mixture, whereby said fuel gas acts as a diluent and a source of heat for said ethylbenzene, and thereby reduces the steam requirements of said process.

4. The improved process of claim 3 wherein said fuel gas is rich in methane.

5. The improved process of claim 3 wherein fuel gas is fed to said reactor in the ratio of from about one to about four moles of fuel gas for each mole of ethylbenzene.

6. The improved process of claim 3 wherein from about 6 to about 16 moles of steam and from about one to about four moles of fuel gas are fed to said reactor for each mole of ethylbenzene.

7. The improved process of claim 3 wherein said steam and fuel gas are preheated to a temperature in the range of about 1000 to about 1400° F. before being fed into said reactor.

8. The improved process of claim 7 wherein said steam, fuel gas and ethylbenzene are admixed before being fed into said reactor.

9. The improved process of claim 3 wherein said reactor effluent includes unreacted fuel gas, and further including the step of recovering fuel gas from said effluent.

10. The improved process of claim 9 comprising the step of burning at least a part of said recovered fuel gas to produce heat, using said heat to convert water to steam, and feeding the steam produced with said heat to said reactor with an additional quantity of fuel gas and ethylbenzene.

11. The improved process of claim 7 wherein said fuel gas is predominantly methane gas.

12. In a process involving catalytic dehydrogenation of an alkylated benzene in the presence of steam in a dehydrogenation reactor to produce styrene or a homologue thereof, the improvement comprising introducing a quantity of a combustible fuel gas at an elevated temperature into the dehydrogenation reactor as a heat source for the dehydrogenation reaction, whereby to reduce the steam requirements of said process.

13. The process of claim 12 wherein said fuel gas is fed to said reactor in admixture with said alkylated benzene.

14. A process for producing styrene comprising the steps of feeding a mixture consisting essentially of ethylbenzene, steam and a heated combustible fuel gas to a dehydrogenation reactor, dehydrogenating said ethylbenzene in said reactor so as to produce a reaction effluent comprising styrene, steam, fuel gas and any unreacted ethylbenzene, recovering styrene and fuel gas separately from said reaction effluent, burning at least some of said recovered fuel gas to produce heat, and utilizing at least some of said heat to satisfy at least some of the heat requirements of said dehydrogenating process.

15. A process according to claim 14 wherein from about 6 to about 16 moles of steam and from about 1 to about 4 moles of fuel gas are fed to said reactor with each mole of ethylbenzene.

16. A process according to claim 14 wherein said reactor is maintained at a temperature between about 1000° F. and about 1200° F.

References Cited
UNITED STATES PATENTS

| | | | |
|---|---|---|---|
| 3,456,026 | 7/1969 | Cohen | 260—669 |
| 3,585,248 | 6/1971 | Pasternak et al. | 260—669 |
| 3,417,156 | 12/1968 | Berger | 260—669 |

CURTIS, R. DAVIS, Primary Examiner